(12) United States Patent
Kirzhner et al.

(10) Patent No.: US 6,588,262 B2
(45) Date of Patent: Jul. 8, 2003

(54) MOTION SENSOR FOR HIGH PRESSURE FLUID DELIVERY DEVICE

(75) Inventors: Joseph D. Kirzhner, Columbus, IN (US); Lester L. Peters, Columbus, IN (US); Todd M. Wieland, Bloomington, IL (US); Wayne A. Eckerle, Columbus, IN (US)

(73) Assignee: Cummins Inc., Columbus, IN (US)

( * ) Notice: Subject to any disclaimer, the term of this patent is extended or adjusted under 35 U.S.C. 154(b) by 60 days.

(21) Appl. No.: 09/782,510

(22) Filed: Feb. 14, 2001

(65) Prior Publication Data

US 2002/0108433 A1 Aug. 15, 2002

(51) Int. Cl.$^7$ .............................................. G01M 15/00
(52) U.S. Cl. ................................................... 73/119 A
(58) Field of Search ............................ 73/119 A, 753, 73/754, 756, 866.5, 115, 141, 727; 123/261, 287, 297, 305, 357, 358, 359, 446, 478, 612, 617

(56) References Cited

U.S. PATENT DOCUMENTS

| | | |
|---|---|---|
| 4,359,895 A | 11/1982 | Wolff et al. |
| 4,397,180 A | 8/1983 | Wolff et al. |
| 4,494,507 A | 1/1985 | Yasuhara |
| 4,587,840 A | 5/1986 | Dobler et al. |
| 4,622,942 A | 11/1986 | Nozaki et al. |
| 4,624,135 A | 11/1986 | Bungay et al. |
| 4,838,080 A | 6/1989 | Okano |
| 4,858,466 A | 8/1989 | Takahashi et al. |
| 4,893,750 A | 1/1990 | Haworth et al. |
| 5,144,841 A | 9/1992 | Brouwers et al. |
| 5,676,114 A | 10/1997 | Tarr et al. |
| 5,819,704 A | * 10/1998 | Tarr et al. .................... 123/467 |

* cited by examiner

Primary Examiner—Kamand Cuneo
Assistant Examiner—Monica D. Harrison
(74) Attorney, Agent, or Firm—Nixon Peabody LLP; Tim L. Brackett, Jr.

(57) ABSTRACT

A novel and improved motion sensor for high pressure fluid delivery devices is provided which effectively senses movement of a component in a high pressure environment while minimizing the likelihood of fluid leakage through a receiving cavity containing at least a portion of the sensor. The motion sensor includes a sealing surface shaped and positioned relative to a force resisting surface formed on an annular cavity surface of the receiving cavity so as to apply a fluid, e.g. fuel, pressure induced sealing force against the force resisting surface due to the high pressure fluid forces acting on the sensor body. The sealing surface may be conically shaped for contacting a complementary conically shaped force resisting surface and/or the sealing surface may extend perpendicular to the direction of the fluid forces acting on the sensor body for abutment against a complementary positioned annular land containing the force resisting surface.

26 Claims, 3 Drawing Sheets

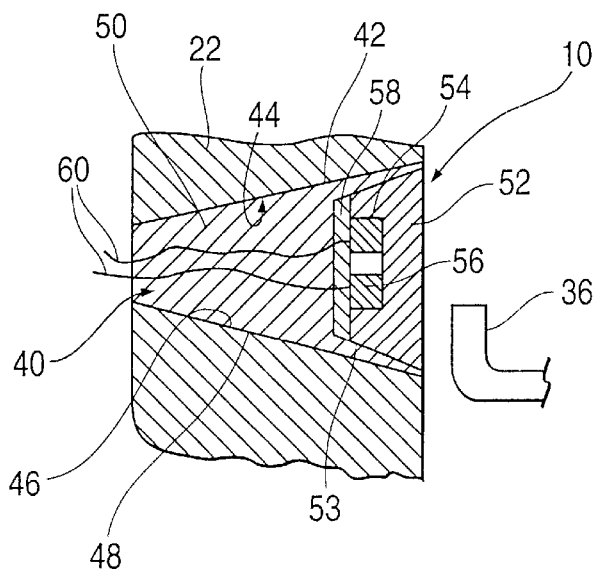
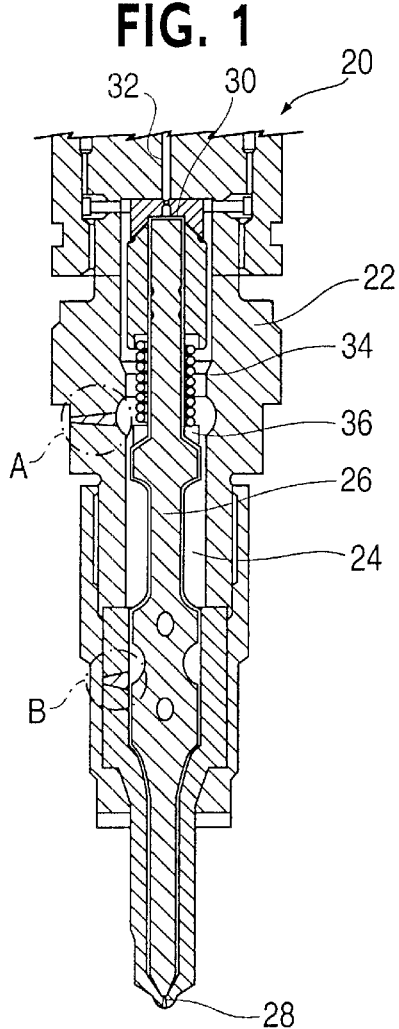
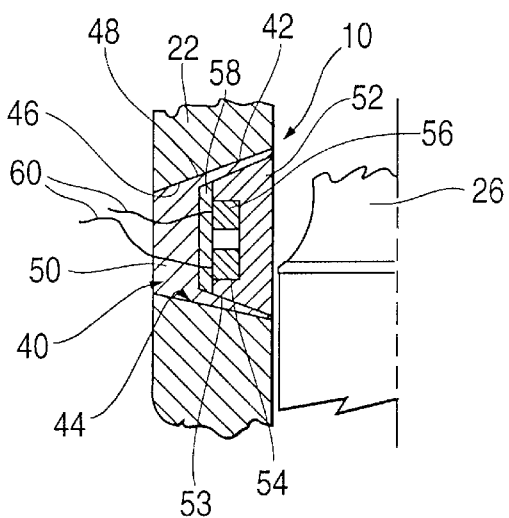

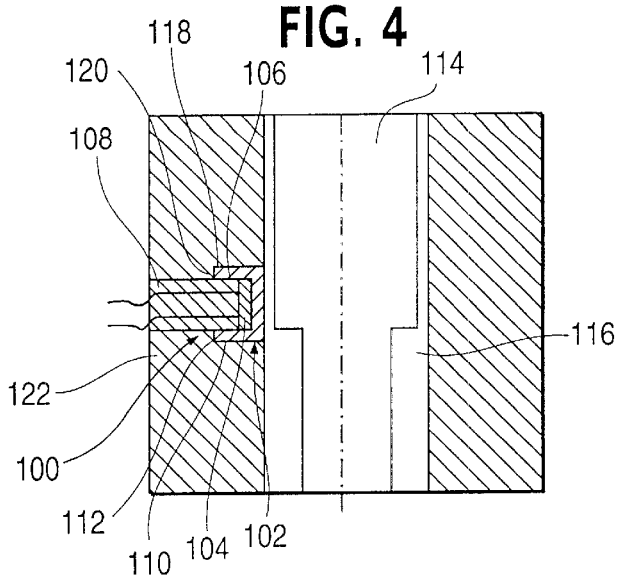
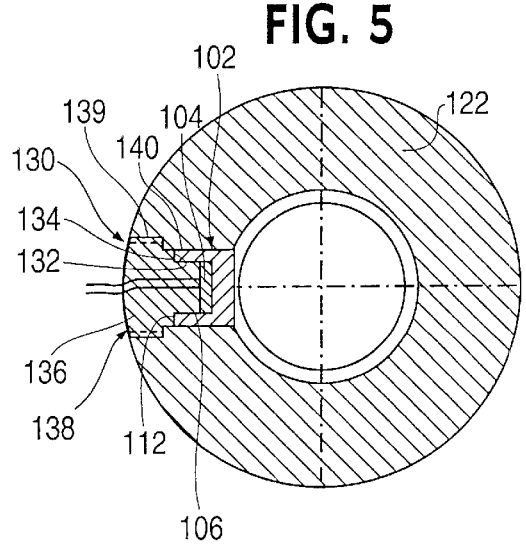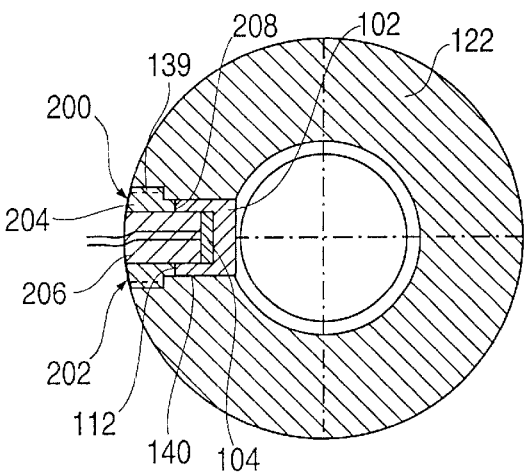
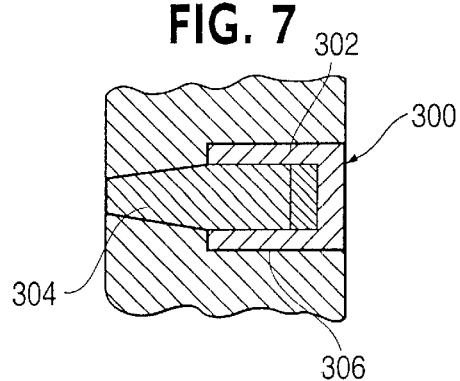

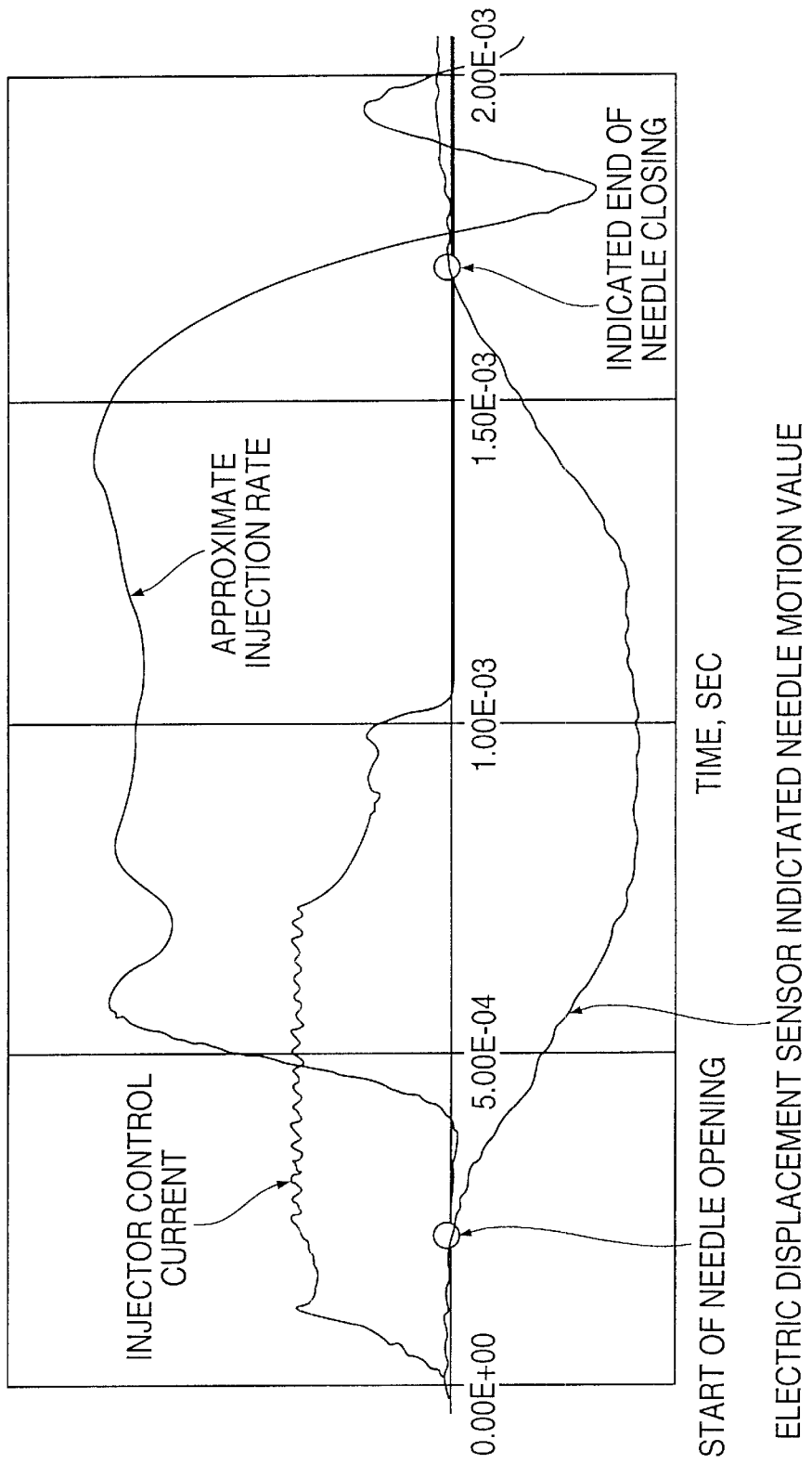

MOTION SENSOR FOR HIGH PRESSURE FLUID DELIVERY DEVICE

TECHNICAL FIELD

This invention relates to an improved motion sensor for sensing motion and thus providing positional information for moving components positioned in high pressure fluid in a fluid delivery device, such as a high pressure fuel pump or injector.

BACKGROUND OF THE INVENTION

As a result of stringent government fuel consumption and emissions regulations, fuel injection pressure, timing and quantity control has become even more important to optimize combustion and meet the regulatory requirements. Also, precise diagnostic information relating to fuel system operation provides valuable data for monitoring and controlling fuel system and engine operation. The measurement of fuel delivery plunger and control valve element motion and/or position provides valuable information for diagnostic evaluation and feedback control to assist in optimizing engine operation. In most high pressure fuel systems applicable to internal combustion engines, high pressure fuel delivery devices, such as fuel injectors and fuel pumps, incorporate various reciprocating members used to pressurize fuel and/or control fuel delivery. For example, a reciprocating high pressure plunger may be used to increase the pressure of supply fuel to a high pressure level for injection. Also, control valve elements, such as a needle valve element in a closed nozzle injector or an injection control valve element of an electronically controlled injection valve, are used to control the flow of fuel for injection or for injection timing/quantity control purposes.

Both plungers and control valve elements reciprocate at very high frequencies during operations. For example, a needle valve for a closed nozzle injector is opened and closed at appropriately timed intervals to inject desired amounts of fuel into a cylinder of an internal combustion engine, such as a diesel engine. It is important to know when the needle valve opens in relation to the engine crank shaft position to ensure the appropriate injection timing. When the needle valve is lifted off the needle seat, the valve opens and fuel is metered through spray orifices into the interior of the engine cylinder. The initial relative axial displacement between the needle and the needle seat determines the beginning of injection as well as the engine ignition timing.

U.S. Pat. No. 4,359,895 to Wolff et al. discloses a needle position indicator for a fuel injector including a Hall effect sensor positioned within a spring cavity containing a spring for biasing the needle valve into a closed position. The Hall effect sensor is mounted on a cylindrical bracket a spaced distance from an outer end of the needle valve element. The Hall effect sensor is positioned between a three lead header and a layer of epoxy encapsulation. A magnet is mounted on the outer end of the needle valve element to generate a magnetic field. The sensor detects changes in the strength of the magnetic field within the cavity caused by relative displacements of the upper portion of the needle. However, the spring cavity is continuously connected to drain and therefore maintained at a low fuel pressure. Consequently, the sensor assembly is not specifically designed to withstand high pressure forces nor to prevent fuel leakage around the sensor assembly. In addition, the sensor requires a magnet attached to the needle valve element thereby undesirably requiring additional components, manufacturing/assembly costs and potential malfunction or damage due to dislodging of the magnet.

Consequently, there is a need for a sensor and a fuel injector incorporating the sensor that effectively and reliably senses plunger/valve element motion while withstanding high fuel pressure forces and tending to prevent fuel leakage around the sensor.

SUMMARY OF THE INVENTION

It is an object of the present invention, therefore, to overcome the disadvantages of the prior art and to provide a sensor for a high pressure fluid delivery device capable of effectively sensing plunger or valve element movement.

It is another object of the present invention to provide a sensor designed with a shape that complements the receiving cavity in a high pressure cavity wall so as to minimize the likelihood of fuel leakage through the cavity.

Another object of the present invention to provide a high pressure fuel delivery device and a displacement sensor positioned in the device such that the fuel pressure forces applied to the sensor push the sensor into sealing contact with the device.

It is yet another object of the present invention to provide a simple and inexpensive sensor capable of maintaining structural stability when subject to very high pressure fuel forces.

It is still another object of the present invention to provide a displacement sensor for high pressure delivery devices that solves the problem of sensor sealing at high pressure.

It is a further object of the present invention to provide a sensor that can be easily and precisely installed and is capable of withstanding high pressure, rapidly changing temperatures and a high vibration environment.

Still another object of the present invention is to provide a sensor for an injector which minimizes design changes to existing injector designs to achieve effective integration of the sensor.

Yet another object of the present invention is to provide a method of forming and installing a displacement sensor for determining the motion of a plunger/needle in a high pressure assembly including the steps of forming a specially shaped sensor receiving cavity opening into a high pressure cavity in which the plunger is mounted and forming the sensor to withstand the high pressure with a shape that complements the receiving cavity whereby the force applied to the sensor by the high fluid pressure pushes the sensor into sealing contact with the sensor receiving cavity.

These and other objects of the present invention are achieved by providing a motion sensor at least partially positionable in a sensor receiving cavity, formed in a high pressure fluid delivery device and defined by an annular cavity surface, for sensing motion of a movable component in the fluid delivery device while being exposed to high fluid pressure forces, wherein the fluid delivery device includes a force resisting surface formed in the sensor receiving cavity. The motion sensor comprises a sensor body shaped for positioning in the sensor receiving cavity in contact with the annular cavity surface, wherein the sensor body includes a sealing surface shaped and positionable to apply a fluid pressure induced sealing force to the force resisting surface due to the high fluid pressure forces acting on the sensor body to prevent high pressure fluid leakage through the sensor receiving cavity. Some portion of the motion sensor, e.g. the sensor element and/or sensor leads/conductors, is securely mounted in the sensor body and positioned in the sensor receiving cavity. The sealing surface may be conically shaped and extend along substantially an entire length of the sensor body. Alternatively, the sealing surface may include a conically shaped portion and a nonconically shaped portion. The sensor body may include a core portion containing the sensor element and an extension portion extending from the core portion wherein the sealing surface is formed on one end of the core portion and extends annularly around the sensor body. In this case, the core portion may be formed of ceramic material and the extension portion formed of an epoxy material. The core portion may be cylindrically shaped and the extension portion conically shaped, wherein the sealing surface is formed on the conically shaped extension portion. Also, the extension portion may have a smaller radial extent than the core portion. The core portion may also include a sensor element cavity containing the sensor element and having an axial extent greater than the sensor element. The sealing surface may be positioned axially along the sensor body a spaced distance from the sensor element. The motion sensor may further include surface variations formed on an outer surface of the sensor body for engaging complementary variations on the annular cavity surface to enhance secure mounting of the sensor body in the receiving cavity. The surface variations may be annular threads. The sealing surface may extend radially and annularly along a plane perpendicular to a longitudinal axis of the sensor body.

The present invention is also directed to a high pressure fuel delivery device comprising a fuel delivery device body including a high pressure chamber containing high pressure fuel, a sensor receiving cavity opening into the high pressure chamber and a force resisting surface positioned in the sensor receiving cavity. The high pressure fuel delivery device further includes a movable component mounted for reciprocal movement in the high pressure chamber and a motion sensor at least partially positioned in the sensor receiving cavity while being exposed to high pressure fuel forces due to the high pressure fuel in the high pressure chamber. The motion sensor includes a sensor body shaped for positioning in the sensor receiving cavity and a sensor element securely mounted in the sensor body. The sensor body includes a sealing surface shaped and positioned to apply a fuel pressure induced sealing force to the force resisting surface during operation of the high pressure fuel delivery device due to the high fuel pressure forces acting on the sensor body to prevent high pressure fuel leakage through the sensor receiving cavity. The sensor receiving cavity may extend through at least a portion of the fuel delivery device in a direction transverse to a longitudinal movement axis of the movable component. The sensor receiving cavity may be defined by an annular cavity surface wherein an outer surface of the sensor body is sized and positioned in annular contact with the annular cavity surface and the force resisting surface is formed on the annular cavity surface. The force resisting surface may be at least partially conically shaped so that an entire length of the force resisting surface may be conically shaped. The force resisting surface may be formed on an annular land extending in a plane transverse to a longitudinal axis of the sensor receiving cavity. The sensor body may include a core portion containing said sensor element in an extension portion extending from the core portion wherein the sealing surface is formed on one end of the core portion and extends annularly around the sensor body. Surface variations may be provided in the annular cavity surface for engaging complementary variations on the outer surface of the sensor body to enhance secure mounting of the sensor body in the receiving cavity.

The present invention is also directed to a method of installing a motion sensor in a high pressure fuel delivery device for sensing the motion of a movable component positioned in the delivery device, comprising the steps of providing a fuel delivery device body including a high pressure fuel chamber for receiving the movable component, a sensor receiving cavity opening into the high pressure fuel chamber and a force resisting surface positioned in the sensor receiving cavity, and providing a motion sensor for sensing motion of the movable component wherein the motion sensor includes a sensor body including a sealing surface shaped to annularly abut the force resisting surface. The method further includes the step of positioning the motion sensor in the sensor receiving cavity with the sealing surface in abutment against the force resisting surface wherein the sealing surface and the force resisting surface are shaped and positioned to cause the sealing surface to apply a fuel pressure induced sealing force to the force resisting surface due to high pressure forces acting on the sensor body during operation of the high pressure fuel delivery device to prevent high pressure fuel leakage through the sensor receiving cavity.

BRIEF DESCRIPTION OF THE DRAWINGS

FIG. 1 is an enlarged, partial cross sectional view of a closed nozzle injector assembly illustrating various locations for incorporating the motion sensor of the present invention;

FIG. 2 is an expanded view of the area A of FIG. 1 showing the details of the motion sensor installed in an upper portion of the injector;

FIG. 3 is an expanded view of the area B of FIG. 1 showing the details of the motion sensor installed in a lower portion of the injector;

FIG. 4 is a partial cross sectional view taken along a longitudinal axis of a portion of an fuel delivery device including another embodiment of the motion sensor of the present invention;

FIG. 5 is a partial transverse cross sectional view of a portion of a fuel delivery device including yet another embodiment of the motion sensor of the present invention;

FIG. 6 is a partial transverse cross sectional view of a portion of a fuel delivery device including still another embodiment of the motion sensor of the present invention;

FIG. 7 is a cut-away cross sectional view of a portion of a fuel delivery device including another embodiment of a sensor receiving cavity for receiving another embodiment of the motion sensor of the present invention; and FIG. 8 is a graph of the needle valve motion indicated by the motion/displacement sensor of present invention.

DETAILED DESCRIPTION OF THE INVENTION

As shown in the accompanying figures, the present invention is directed to a novel and improved motion sensor, indicated in one embodiment at 10 in FIG. 2, a high pressure fluid delivery device, for example, a high pressure fuel injection device 20 as shown in FIG. 1, and a method of installing a motion sensor in a high pressure fluid delivery device. In a preferred embodiment, motion sensor 10 is installed in a fuel injection device 20 which includes a fuel delivery device body 22 containing a high pressure chamber 24 for receiving high pressure fuel. A movable component in the form of a needle valve element 26 is positioned within at least a portion of high pressure chamber 24 and mounted for reciprocal movement to control the flow of fuel from fuel injector 20 into the combustion chamber (not shown) of an engine. Needle valve element 26 may be controlled in a variety of ways so as to move between open and closed positions to control the timing and metering of fuel injection through injector orifices 28. Motion sensor 10 is positioned adjacent a movable component in a manner described hereinbelow so as to effectively sense the motion and therefore provide an indication of the displacement of the movable component thereby providing valuable data for monitoring and controlling fuel system and engine operation in a desired manner.

The fuel injection device 20 as shown in FIG. 1, is of the needle controlled injection type wherein high pressure fuel is delivered to a control volume 30 positioned at an outer end of needle valve element 26 to close needle valve element 26 and wherein fuel is drained from control volume 30 via drain passage 32 to lower the pressure forces in control volume 30 thereby permitting fuel pressure forces to open control valve element 26 permitting injection of fuel through injector orifices 28. A spring 34 is used to bias needle valve element 26 into the closed position and assist movement of needle valve element 26 toward the closed position at the end of an injection event. However, it should be understood that a motion sensor 10 of the present invention may be applied to any high pressure fluid delivery device wherein a movable component is positioned in a high pressure chamber. Therefore, the high pressure fluid delivery device may be a fluid pump, fluid control valve or any other device having a movable component wherein the sensing of the component's motion/displacement is desirable. The present invention may be used in high pressure applications in the range of 1–2000 bar and above, and preferably 300–2000 bar and above. Motion sensor 10 is especially advantageous in high pressure fuel applications wherein the high pressure fluid delivery device is a high pressure fuel control valve, fuel pumping mechanism or fuel injector including a control valve element, pump plunger and needle valve element, respectively. Although the preferred embodiment disclosed herein is directed to a needle controlled injection type injector as shown in FIG. 1, any form of fuel injection device containing a movable plunger or valve element may incorporate motion sensor 10 of the present invention.

The fuel injector 20 disclosed in FIG. 1 illustrates two locations along the injector and high pressure chamber 24 for positioning motion sensor 10. Specifically, location A is positioned adjacent a spring retainer 36, as shown in both FIGS. 1 and 2, for sensing movement of the edge of spring retainer 36 which moves along with needle valve element 26. Location B positions motion sensor 10 adjacent a distinct edge formed on an inner portion of needle valve element 26 as shown in FIGS. 1 and 3. Although FIG. 1 illustrates two motion sensors mounted at different locations on a single injector, the preferred embodiment of the high pressure fluid delivery device of the present invention including motion sensor 10 incorporates only one motion sensor 10. FIG. 1 includes both locations merely to illustrate various alternative installation locations for motion sensor 10. Of course, more than one motion sensor may be incorporated if desirable, for example, one sensor for each movable element in a device. Also, it should be understood that motion sensor 10 may be incorporated at any location along fuel delivery device body 22 adjacent high pressure chamber 24 and needle valve element 26 which permits motion sensor 10 to effectively sense the movement of needle valve element 26.

The embodiments of motion sensor 10 illustrated in FIGS. 2 and 3 will now be described in detail. It should be noted that the embodiment shown in FIGS. 2 and 3 are substantially the same except for the axial location along fuel injector 20, the transverse length of the motion sensor due to the width of the respective portion of the delivery device body and the portion of the needle valve element 26 sensed by motion sensor 10 due to the sensor's location. Therefore, like reference numerals will be used for the same or similar components shown in FIGS. 2 and 3. Motion sensor 10 includes a sensor body 40 shaped for positioning in a sensor receiving cavity 42 formed in delivery device body 22. Sensor receiving cavity 42 is defined by an annular cavity surface 44 and extends in a transverse direction to the longitudinal movement axis of movable component/needle valve element 26. A force resisting surface 46 is formed on annular cavity surface 44 for abutment by motion sensor 10. Specifically, motion sensor 10 includes a sealing surface 48 shaped and positioned to be in annular contact with at least a portion of annular cavity surface 44. Sealing surface 48 of motion sensor 10 is shaped and positioned to apply a fuel pressure induced sealing force to force resisting surface 46 during operation of high pressure fuel injector 20 as described more fully hereinbelow.

In the present embodiment, as shown in FIGS. 2 and 3, sensor body 40 includes an extension portion 50 extending along the entire transverse length of receiving cavity 42 and containing sealing surface 48. In the present embodiment, sealing surface 48 is conically shaped and extends along the entire transverse length of motion sensor 10. Sensor body 40 also includes a core portion 52 positioned in a cavity 53 formed in one end of extension portion 50 adjacent high pressure chamber 24. Core portion 52 includes a sensor element cavity 54 positioned on a side of core portion 52 facing away from high pressure chamber 24. Motion sensor 10 further includes a sensor element 56 securely mounted in sensor element cavity 54. A support 58 is securely mounted on core portion 52 adjacent to sensor element cavity 54 for securing sensor element 56 in sensor element cavity 54. It should be noted that support 58 may be omitted and sensor element 56 secured in sensor element cavity 54 using a small amount of epoxy. Core portion 52 has a conical shape complementary to cavity 53 to secure core portion 52 within sensor receiving cavity 42 as discussed hereinbelow.

Sensor element 56 may be any sensor capable of effectively detecting the motion/displacement of a movable component, such as an electric sensor including an electromagnetic coil and associated electronics, e.g., an inductive sensor. Motion sensor 10 also includes appropriate electrical leads 60 for transmitting sensor signals to an engine processor for monitoring, analyzing and processing the motion signals created by motion sensor 10. Core portion 52 is preferably formed of a high strength, non-conductive, non-metallic material such as machinable ceramic, e.g., different kinds of zirconia. Extension portion 50 is preferably formed of an epoxy material for creating a bond with annular cavity surface 44, support 58 and the outer surface of core portion 52.

Preferably, in the present embodiment, core portion 52 is formed and machined with an outer conical shape and sensor element cavity 54. Sensor element 56 is then inserted into cavity 54 by positioning support 58 against core portion 52 and securing using some form of epoxy. The assembly of core portion 52, sensor element 56 and support 58 is then inserted into the large inner end of sensor receiving cavity 42 via the injector bore prior to inserting needle valve element 26 into the injector bore. Then, prior to assembly of fuel injector 20 and attachment of the retainer on the nozzle housing, leads 60 are pulled through sensor receiving cavity 42 and epoxy injected into the outer smaller end of sensor receiving cavity 42. While core portion 52 is held in the position shown in FIGS. 2 and 3, epoxy is injected into the sensor receiving cavity 42 to fill cavity 42 completely except for the volume occupied by core portion 52 and support 58. Once the epoxy hardens, core portion 52 and extension portion 50 are rigidly attached to the nozzle housing and therefore securely mounted in sensor receiving cavity 42 as shown in FIGS. 2 and 3.

During operation of fuel injector 20, high pressure fuel is present in high pressure chamber 24 for delivery to an engine combustion chamber via injector orifices 28 upon the outward movement of needle valve element 26 from the closed position as shown in FIG. 1 to an open position. Motion sensor 10 senses the movement of needle valve element 26 from the closed position to the open position, and subsequently from the open position to the closed position, by sensing the edge of spring retainer 36 if positioned in location A or the edge of needle valve element 26 if positioned in location B. In the embodiment of FIG. 1, an injection control valve operated by, for example, a solenoid assembly, receives injector control current which causes high pressure fuel to be drained through drain passage 32 from control volume 30. As a result, fuel pressure forces tending to open needle valve element 26 force needle valve element 26 toward the open position. As shown in FIG. 8, the motion or displacement sensor indicates needle valve element displacement during the injection event. The control current and injection rate curves are provided in FIG. 8 as a reference to the operation of the injector and the characteristics of the injection event. The motion sensor 10 and fuel injector 20 incorporating the motion sensor 10 of the present invention importantly function to minimize the likelihood, or even prevent, high pressure fuel from leaking through sensor receiving cavity 42. The present invention is especially effective of course in high pressure fluid applications, such as high pressure fuel injection systems, wherein the fluid positioned adjacent the core portion exists at a very high pressure. Under these conditions, the fluid, i.e. fuel, will have a tendency to leak through the interface between the motion sensor and the wall forming the receiving cavity for the sensor. However, the motion sensor, and the fluid delivery device incorporating the motion sensor of the present invention, effectively utilizes the high pressure fluid acting on the motion sensor to create a fluid pressure induced sealing force between motion sensor 10 and force resisting surface 46. As shown in FIGS. 2 and 3, high pressure fluid, i.e. fuel, acting on motion sensor 10 creates fluid pressure induced forces acting to the left in FIGS. 2 and 3 tending to press motion sensor 10 into sensor receiving cavity 42. As a result, sealing surface 48 is forced against force resisting surface 46 around the entire annular extent of sensor body 40 and along the entire transverse length of sensor body 40. The complementary conical shape of sealing surface 48 and force resisting surface 46 permit secure annular contact between the surfaces which is enhanced by the fluid pressure forces to create an optimum sealing effect. In an alternative embodiment, extension portion 50 may be formed and machined into the conical shape shown in FIGS. 2 and 3 including cavity 54. In such an embodiment, core portion 52 may be secured to extension portion 50 before or after inserting extension portion 50 into sensor receiving cavity 40 via the needle valve element bore of injector 20.

FIG. 4 illustrates another embodiment of the motion sensor of the present invention, and of the high pressure fluid delivery device of the present invention. In the present embodiment, a motion sensor 100 includes a core portion 102 having a cylindrical shape and a sensor element 104 positioned in a sensor element cavity 106 formed in core portion 102. Sensor element cavity 106 includes an axial extent greater than the axial extent of sensor element 104. In this manner, an extension portion 108 extends into sensor element cavity 106 to abut and secure sensor element 104 in place. As with the previous embodiment, core portion 104 may be formed of a high strength, non-conductive, non-metallic material and positioned in sensor receiving cavity 110 prior to assembly of the injector. Extension portion 108 may be formed of an epoxy material injected into the sensor receiving cavity 110 while holding core portion 102 in the position shown in FIG. 4 thereby securing the assembly in sensor receiving cavity 110 upon hardening of the epoxy. Importantly, in the present embodiment, motion sensor 100 includes a sealing surface 112 formed on one end of core portion 102, positioned axially along the sensor body a spaced distance from sensor element 104 and extending radially and annularly along a plane perpendicular to both the longitudinal axis of the sensor body and the direction of fluid forces acting on the sensor body, and parallel to the movement axis of the movable component 114 positioned in a high pressure chamber 116. Sealing surface 112 is positioned for abutment against a force resisting surface 118 formed on an annular land 120 formed in fluid delivery device 122 within sensor receiving cavity 110. Force resisting surface 118 and annular land 120 extend in a plane transverse to a longitudinal axis of a sensor receiving cavity in a complementary manner to sealing surface 112 as shown in FIG. 4. Alternatively, annular land 120 may be positioned at an angle to the longitudinal axis of sensor receiving cavity 110. Core portion 102 is machined with a predetermined length so that when installed into sensor receiving cavity 110 with sealing surface 112 in abutment against annular land 120, the opposite face of core portion 102 is approximately flush with the inner wall forming high pressure chamber 116. Importantly, like the previous embodiment, sealing annular contact between sealing surface 112 and force resisting surface 118 is enhanced by fuel pressure forces acting on core portion 102 to the left as shown in FIG. 4 thereby creating a high sealing force between sealing surface 112 and force resisting surface 118 which prevents pressurized fuel from leaking outwardly from high pressure chamber 116 through the interface of motion sensor 100 and the annular cavity surface of sensor receiving cavity 110. The operation of motion sensor 100 is the same as described above in relation to the embodiments of FIGS. 1–3.

FIG. 5 discloses yet another embodiment of the present invention similar to the previous embodiment of FIG. 4 and therefore like reference numerals will be used to indicate the same components. In the embodiment of FIG. 5, a motion sensor 130 includes an annular land 132 with a force resisting surface 134 formed on an extension portion 136 of sensor body 138, instead of being formed on the body of the fuel delivery device 122. Moreover, in order to create a more secure connection between sensor body 138 and fuel delivery device 122, surface variations 139, i.e. annular threads, are formed in the annular cavity surface adjacent extension portion 136 for engaging complementary surface variations formed on the outer surface of extension portion 136. Preferably, extension portion 136 is formed by injecting epoxy into sensor receiving cavity 140 causing the epoxy to engage the threads. Once the epoxy hardens, these surface variations provide structural support to motion sensor 130 and assist in preventing motion sensor 130 from moving to the left as shown in FIG. 5 under fluid induced pressure forces. Thus, the surface variations function to provide a rigid fixed force resisting surface 134 for secure sealing abutment by sealing surface 112 as described with respect to the previous embodiment.

FIG. 6 discloses yet another embodiment of the present invention which is similar to the embodiment of FIG. 5 except that the motion sensor 200 includes an extension portion 202 comprised of an outer threaded sleeve 204 formed of a rigid material having surface variations 139, i.e. outer annular threads for engaging complementary internal threads formed on the body of fuel delivery device 122 within sensor receiving cavity 140. Extension portion 202 further includes an inner epoxy portion 206 for securing sensor element 104 and core portion 102 within sensor receiving cavity 140. In this embodiment, the inner end of outer threaded sleeve 204 forms an annular land 208 having the force resisting surface for abutment by sealing surface 112 formed on core portion 102. The sealing advantages and operation of the motion sensor 200 is similar to that of the previous embodiments. Moreover, by using a rigid outer threaded sleeve formed of a high strength material, instead of an epoxy, for engaging complementary threads formed on the injector body, enhanced support is provided to core portion 102 thereby further enhancing the structural integrity of motion sensor 200 while providing a strengthened force resisting surface for abutment by sealing surface 112 thus minimizing the likelihood of fuel leakage and sensor blowout due to high pressure fuel acting on the inner face of core portion 102.

FIG. 7 discloses yet another embodiment of the present invention which is similar to the embodiment of FIG. 4 except that the motion sensor 300 of FIG. 7 includes a core portion 302 having a longer axial extent, and an extension portion 304 is conically shaped instead of cylindrically shaped. Core portion 302 includes a longer axial length along sensor receiving cavity 306 for the purpose of increasing the structural strength of core portion 302 and resistance to structural breakdown due to the high pressure fluid forces acting on core portion 302. As shown, core portion 302 extends through sensor receiving cavity 306 an axial distance greater than half the length of sensor receiving cavity 306. Extension portion 304 is conically shaped to increase the ability of the hardened epoxy to withstand high pressure forces. The operation of motion sensor 300 and other advantages are similar to those described above with respect to the previous embodiments.

With respect to each of the embodiments discussed hereinabove, an alternative design may include omitting the separate core portion 52, 102 and using the epoxy resin to form the entire sensor body for sealing and protecting the portion of the sensor positioned in the sensor receiving cavity, e.g. sensor elements and/or leads. In another variation, the sensor element 56, 104 may be positioned in another location inside the fuel delivery device while only a portion of the motion sensor, e.g., leads or conductors, extends through the sensor receiving cavity.

Thus the present invention creates a novel and improved motion sensor capable of effectively sensing movable component displacement while providing an enhanced sealing effect between the sensor and the adjacent cavity surface to prevent high pressure fuel leakage through the sensor receiving cavity. The present invention advantageously utilizes the high pressure of the fluid in the cavity adjacent the sensor to create a sealing force between the sensor body and the cavity surface which enhances the contact and sealing effect between the surfaces in a manner proportional to an increase in fluid pressure. That is, the greater the fluid pressure acting on the sensor body, the greater the sealing effect between the sensor body and the annular cavity surface. Moreover, the sensor is designed with the proper shape and dimensions to enhance structural integrity to prevent sensor, e.g. sensor element and/or sensor leads, breakdown and blowout due to the high pressure fluid forces.

INDUSTRIAL APPLICABILITY

It is understood that the present invention is applicable to all high pressure fluid systems, and specifically to internal combustion engines utilizing a fuel delivery device, including pumps, all closed nozzle injectors, and unit injectors. This invention is particularly applicable to fuel delivery devices used in diesel engines which require accurate fuel injection metering and timing control to minimize emissions. Such internal combustion engines including a fuel delivery device and motion sensor in accordance with the present invention can be widely used in all industrial fields and non-commercial applications, including trucks, passenger cars, industrial equipment, stationary power plant and others.

We claim:

1. A motion sensor for sensing motion of a movable component in a high speed fluid delivery device while being exposed to high fuel pressure forces, the motion sensor being at least partially positionable in a sensor receiving cavity, formed in the fluid delivery device and defined by an annular cavity surface, the fluid delivery device including a force resisting surface formed in the sensor receiving cavity, the motion sensor comprising:

a sensor body shaped for positioning in the sensor receiving cavity in contact with the annular cavity surface;

wherein said sensor body includes a sealing surface shaped and positionable to apply a fluid pressure induced sealing force against the force resisting surface due to the high fluid pressure forces acting on said sensor body to prevent high pressure fluid leakage through said sensor receiving cavity; and a sensor element disposed in the sensor body for detecting the motion of the movable component.

2. The sensor of claim 1, further including a sensor element securely mounted in said sensor body.

3. The sensor of claim 1, wherein said sealing surface is conically shaped and extends along substantially an entire length of said sensor body.

4. The sensor of claim 2, wherein said sealing surface includes a conically shaped portion and a nonconically shaped portion.

5. The sensor of claim 4, wherein said sensor body includes a core portion containing said sensor element and an extension portion extending from said core portion, said sealing surface formed on one end of said core portion and extending annularly around said sensor body.

6. The sensor of claim 5, wherein said core portion is formed of ceramic material and said extension portion formed of an epoxy material.

7. The sensor of claim 5, wherein said core portion is cylindrically shaped and said extension portion is conically shaped, said sealing surface further formed on said conically shaped extension portion.

8. The sensor of claim 5, wherein said extension portion has a smaller radial extent than said core portion.

9. The sensor of claim 5, wherein said core portion includes a sensor element cavity containing said sensor element and having an axial extent greater than said sensor element, said sealing surface positioned axially along said sensor body a spaced distance from said sensor element.

10. The sensor of claim 1, further including surface variations formed on an outer surface of said sensor body for engaging complementary variations on the annular cavity surface to enhance secure mounting of said sensor body in the receiving cavity.

11. The sensor of claim 10, wherein said surface variations are annular threads.

12. The sensor of claim 5, wherein said sealing surface extends radially and annularly along a plane perpendicular to a longitudinal axis of said sensor body.

13. A high pressure fuel delivery device, comprising:
a fuel delivery device body including a high pressure chamber containing high pressure fuel, a sensor receiving cavity opening into said high pressure chamber and a force resisting surface positioned in said sensor receiving cavity;
a movable component mounted for reciprocal movement in said high pressure chamber;
a motion sensor at least partially positioned in said sensor receiving cavity while being exposed to high fuel pressure forces due to the high pressure fuel in said high pressure chamber, said motion sensor including a sensor body shaped for positioning in said sensor receiving cavity and a sensor element securely mounted in said sensor body for sensing the movement of the movable component, wherein said sensor body includes a sealing surface shaped and positioned to apply a fuel pressure induced sealing force to the force resisting surface during operation of the high pressure fuel delivery device due to the high fuel pressure forces acting on said sensor body to prevent high pressure fuel leakage through said sensor receiving cavity.

14. The device of claim 13, wherein said sensor receiving cavity extends through at least a portion of said fuel delivery device body in a direction transverse to a longitudinal movement axis of said movable component.

15. The device of claim 14, wherein said sensor receiving cavity is defined by an annular cavity surface, an outer surface of said sensor body sized and positioned in annular contact with said annular cavity surface, said force resisting surface formed on said annular cavity surface.

16. The device of claim 15, wherein said force resisting surface is at least partially conically shaped.

17. The device of claim 15, wherein an entire length of said force resisting surface is conically shaped.

18. The device of claim 15, wherein said force resisting surface is formed on an annular land extending in a plane transverse to a longitudinal axis of said sensor receiving cavity.

19. The device of claim 13, wherein said sensor body includes a core portion containing said sensor element and an extension portion extending from said core portion, said sealing surface formed on one end of said core portion and extending annularly around said sensor body.

20. The device of claim 19, wherein said core portion is formed of ceramic material and said extension portion formed of an epoxy material.

21. The device of claim 19, wherein said core portion is cylindrically shaped and said extension portion is conically shaped, said sealing surface further formed on said conically shaped extension portion.

22. The device of claim 19, wherein said extension portion has a smaller radial extent than said core portion.

23. The device of claim 19, wherein said core portion includes a sensor element cavity containing said sensor element and having an axial extent greater than said sensor element, said sealing surface positioned axially along said sensor body a spaced distance from said sensor element.

24. The device of claim 15, further including surface variations formed in said annular cavity surface for engaging complementary variations on the outer surface of said sensor body to enhance secure mounting of said sensor body in the receiving cavity.

25. The device of claim 24, wherein said surface variations are annular threads.

26. A method of installing a motion sensor in a high pressure fluid delivery device for sensing the motion of a movable component positioned in the delivery device, comprising the steps of:
providing a fluid delivery device body including a high pressure fluid chamber for receiving the movable component, a sensor receiving cavity opening into said high pressure fluid chamber and a force resisting surface positioned in said sensor receiving cavity;
providing a motion sensor for sensing motion of said movable component, said motion sensor including a sensor body including a sealing surface shaped to annularly abut said force resisting surface;
positioning said motion sensor in said sensor receiving cavity with said sealing surface in abutment against said force resisting surface, said sealing surface and said force resisting surface shaped and positioned to cause said sealing surface to apply a fluid pressure induced sealing force to the force resisting surface due to high fluid pressure forces acting on said sensor body during operation of the high pressure fluid delivery device to prevent high pressure fluid leakage through said sensor receiving cavity.

* * * * *